E. M. C. SCHMIDT.
EGG AND CREAM BEATER.
APPLICATION FILED SEPT. 4, 1914.
1,154,940.
Patented Sept. 28, 1915.
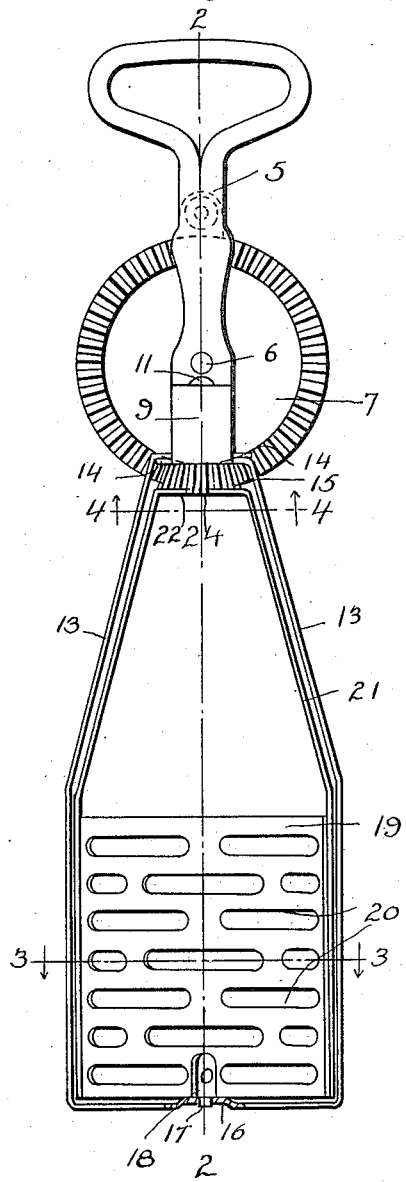
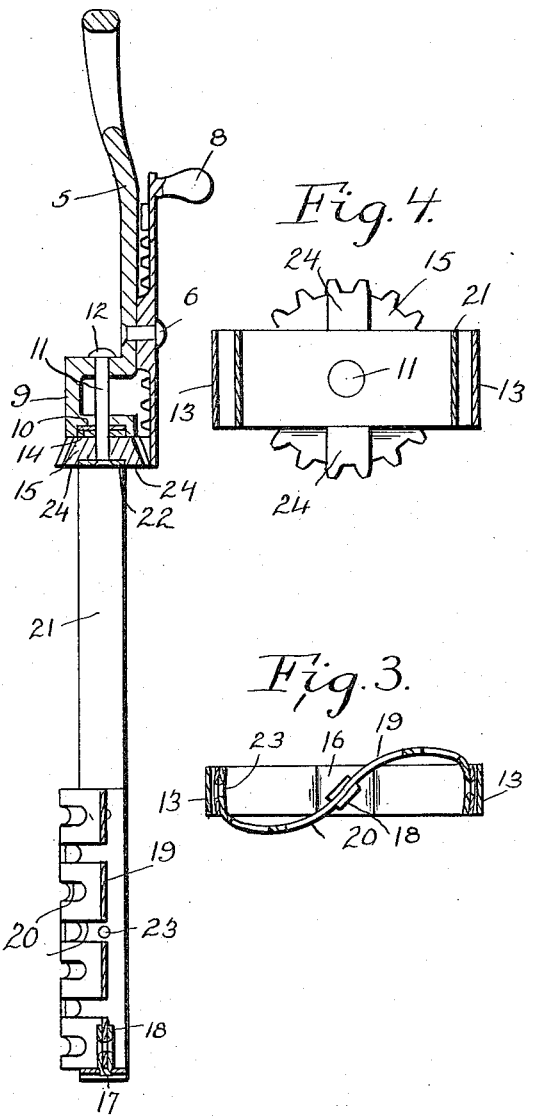
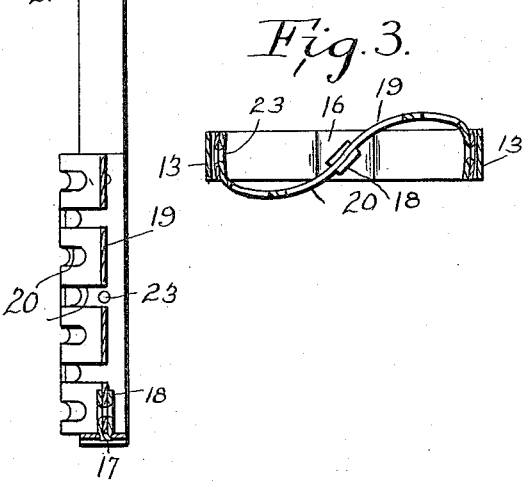
Witnesses
R. N. Jones
Inventor
E. M. C. Schmidt
By A. Randolph Jr.
Attorney

UNITED STATES PATENT OFFICE.

ERNST M. C. SCHMIDT, OF TARRYTOWN, NEW YORK.

EGG AND CREAM BEATER.

1,154,940.  Specification of Letters Patent.  Patented Sept. 28, 1915.

Application filed September 4, 1914. Serial No. 860,282.

*To all whom it may concern:*

Be it known that I, ERNST M. C. SCHMIDT, a citizen of the United States of America, residing at Tarrytown, in the county of Westchester and State of New York, have invented certain new and useful Improvements in Egg and Cream Beaters; and I do hereby declare the following to be a full, clear, and exact description of the invention, such as will enable others skilled in the art to which it appertains to make and use the same.

This invention relates to beaters or mixers, especially designed for beating and mixing eggs, cream and the like.

The object of the invention is the provision of a device of this character of improved and simplified construction which may be manufactured at small cost.

With this and other objects in view, the invention consists in the novel construction, arrangement and combination of parts as will be hereinafter specifically described, claimed and illustrated in the accompanying drawings, in which, Figure 1 represents a front elevation of the beater or mixer, Fig. 2 represents a vertical central sectional view therethrough, on the line 2—2 of Fig. 1, Fig. 3 represents a transverse sectional view on the line 3—3 of Fig. 1, and, Fig. 4 represents a transverse sectional view looking upwardly on the line 4—4 of Fig. 1.

Referring to the drawing, wherein similar reference numerals designate corresponding parts throughout the several views, the numeral 5 indicates a handle adjacent the center of which a headed pin 6 is secured and provides a rotatable mounting for the driving bevel gear wheel 7 on which is secured the crank handle 8. The lower portion of the handle 5 is offset into U-shape, as indicated at 9, and provided in the free extremity of the offset is a recess or seat 10 communicating with an aperture formed in alinement with an aperture through the upper part of the offset receiving a vertical pin or shaft 11 having a supporting head 12 on one end.

The upper converged ends 13 of a relatively stationary outer frame substantially inverted U-shaped, are overlapped as indicated at 14, and apertured, being seated within the recess or seat 10 and secured against removal laterally therefrom by the pin 11 and the driven bevel gear wheel 15 meshed by the driving bevel gear wheel 7 and secured on the lower portion of said pin 11 below the overlapped ends 14 of the outer frame. The central portion 16 of the web portion at the lower portion of the relatively stationary inverted U-shaped outer frame is inset, as indicated at 16, and apertured to receive the pin 17 carrying ears 18 secured centrally of the lower end of a dasher or beater plate 19 having a transversely arranged series of overlapped slots or openings 20 therein and being substantially sigmoid or S-shaped in cross section and of unbroken contour, as illustrated in Fig. 3. The dasher or beater has broad flattened longitudinal sides approximately parallel and adapted to pull the material inwardly toward the axis of rotation. A relatively rotatable inner frame substantially inverted U-shaped is rotatably mounted within the inverted U-shaped outer frame 13 and comprises a pair of arms 21 extending angularly from the web portion 22 at its upper end and diverged from the latter.

The free extremities of the arms 21, which are parallel, are secured to the longitudinal side faces of the dasher or beater plate 19 by suitable rivets or the like 23. The under face of the driven bevel gear wheel 15 is formed with a pair of spaced lugs 24 between which the web portion 22 of the rotatable inner frame is seated. The pin or shaft 11 extends through the web portion 22 of the rotatable inner frame and is flattened against the under face of the latter to prevent its removal and to secure the parts in operative position.

A dasher or beater plate of sigmoid or S-shaped transverse section is adapted by its construction to pull the material which is to be acted upon. The forwardly presented curved wings thus provided by the shape of the dasher or beater plate counteracts the centrifugal action of the material operated upon. The dasher or beater plate being formed of sheet metal having transverse overlapping openings or slots presents a greater beating surface than is found in the old forms of beaters. Where cream is whipped by this device only about one-third of the usual time is taken to accomplish the whipping.

It will be observed that the beater plate is of unbroken contour from side to side and throughout its entire zone.

What I claim is:—

1. A device of the character described comprising a beater frame having a perforated dasher of unbroken contour, S-shape in transverse section with its oppositely presented longitudinal sides conforming approximately to the circular path of travel of the sides concentric with the axis of rotation, secured to the beater frame, means supporting the beater frame and means for revolving the latter.

2. A device of the character described comprising a beater frame having a perforated dasher of unbroken contour, S-shape in transverse section and formed with broad flattened longitudinal sides, approximately parallel, secured to the beater frame, means supporting the beater frame and means for revolving the latter.

3. A device of the character described comprising a handle having a U shaped inwardly extending offset at its lower end formed with a recess in its lower arm and apertures in its arms in alinement with the recess, an outwardly projecting rotatable mounting located on the handle above the offset, an inverted U shaped outer frame formed with upwardly extending arms overlapped within the recess of the offset at their ends, a driven bevel gear formed with spaced lugs and seated against the lapped ends of the outer frame and against the lower arm of the offset, an inner frame conforming in shape to the outer frame, formed with a web seated against the driven bevel gear between its lugs, downwardly diverging arms and parallel extremities, a perforated dasher of S shape in transverse section and of unbroken contour, having staggered slots and secured by its side faces to the parallel extremities of the inner frame, a headed pin securing the web of the inner frame, the driven bevel gear wheel, and overlapped arms to the arms of the offset, a pivot pin mounted in the web of the outer frame having ears to which the dasher is secured, and a driving bevel gear wheel mounted on the rotatable mounting and meshing with the driven bevel gear wheel.

In testimony whereof I affix my signature in presence of two witnesses.

ERNST M. C. SCHMIDT.

Witnesses:
EWALD BRAUN,
FRANK C. MOENIG.

Copies of this patent may be obtained for five cents each, by addressing the "Commissioner of Patents, Washington, D. C."